United States Patent [19]

Harrison et al.

[11] Patent Number: 5,752,218
[45] Date of Patent: May 12, 1998

[54] REDUCED-POWER GPS-BASED SYSTEM FOR TRACKING MULTIPLE OBJECTS FROM A CENTRAL LOCATION

[75] Inventors: Daniel David Harrison, Delanson; Anantha Krishnan Pradeep, Clifton Park; Glen William Brooksby, Glenville; Stephen Michael Hladik, Albany, all of N.Y.

[73] Assignee: General Electric Company, Schenectady, N.Y.

[21] Appl. No.: 924,478

[22] Filed: Aug. 25, 1997

Related U.S. Application Data

[63] Continuation of Ser. No. 456,229, May 31, 1995, abandoned.

[51] Int. Cl.[6] .............................. H04B 7/185; G01S 5/02
[52] U.S. Cl. .......................... 701/207; 701/213; 701/215; 701/300; 342/357; 342/457
[58] Field of Search ................................ 701/207, 213, 701/214, 215, 216, 223, 300; 342/357, 356, 358, 450, 457

[56] References Cited

U.S. PATENT DOCUMENTS

| | | | |
|---|---|---|---|
| 4,689,626 | 8/1987 | Hori et al. | 342/357 |
| 4,785,463 | 11/1988 | Janc et al. | 364/443 |
| 4,897,661 | 1/1990 | Hiraiwa | 342/457 |
| 5,008,679 | 4/1991 | Effland et al. | 342/353 |
| 5,119,102 | 6/1992 | Barnard | 342/457 |
| 5,150,310 | 9/1992 | Greenspun et al. | 364/516 |
| 5,160,935 | 11/1992 | Inamiya | 342/357 |
| 5,225,842 | 7/1993 | Brown et al. | 342/357 |
| 5,345,245 | 9/1994 | Ishikawa et al. | 342/357 |
| 5,379,224 | 1/1995 | Brown et al. | 364/449 |
| 5,430,657 | 7/1995 | Kyrtsos | 364/459 |

FOREIGN PATENT DOCUMENTS

WO8706410  4/1987  WIPO.
WO9221181  5/1992  WIPO.

*Primary Examiner*—Tan Q. Nguyen
*Attorney, Agent, or Firm*—Marvin Snyder; Douglas E. Stoner

[57] ABSTRACT

Location of an object to be tracked is determined by measuring, at a receiver situated at the object, the propagation time differences between the signals from a plurality of GPS satellites, each of which is received by the receiver situated at the object. The measured propagation time difference values are transmitted to a central station where the location of the object to be tracked is calculated based upon the propagation time differences of the signals transmitted from the satellites and data derived from a receiver apart from the object but also receiving signals from the satellites.

18 Claims, 5 Drawing Sheets

5,752,218

REDUCED-POWER GPS-BASED SYSTEM FOR TRACKING MULTIPLE OBJECTS FROM A CENTRAL LOCATION

This application is a continuation of application Ser. No. 08/456,229 filed May 31, 1995 now abandoned.

FIELD OF THE INVENTION

This invention relates to object tracking systems used to locate and track multiple terrestrial (including water-based) objects and, more particularly, to power efficient object tracking systems based upon information obtained from satellites.

BACKGROUND OF THE INVENTION

The tracking and location of assets such as railcars, shipping or cargo containers, trucks, truck trailers, automobiles, etc. can be highly advantageous in commerce. Precise tracking of such vehicles and objects can facilitate their being allocated and positioned in an efficient manner, and can provide for immediate, accurate localization of lost, delayed or damaged assets. The space-based global positioning system (GPS) implemented by the United States Department of Defense constitutes a convenient instrumentality for determining geographical position in real time.

The GPS is a multiple satellite-based radio positioning system in which each satellite transmits data that allows precise measurement of the distance from selected ones of the GPS satellites to the antenna of a user's receiver so as to enable the user to compute position, velocity and time parameters through known triangulation techniques. The signals provided by the GPS can be received both globally and continuously.

The GPS comprises three major segments known as the space, control and user segments. The space segment consists of 21 operational satellites and three spare satellites. The satellites are positioned in a constellation such that typically seven satellites, but a minimum of four, are observable by a user anywhere on or near the earth's surface. Each satellite transmits signals on two frequencies known as L1 (1575.42 MHz) and L2 (1227.6 MHz), using spread spectrum techniques that employ two types of spreading functions.

C/A (or coarse/acquisition code) and P (or precise) pseudo random noise (PRN) codes are transmitted on frequency L1, and P code only is transmitted on frequency L2. The C/A is available to any user, military or civilian, but the P code is only available to authorized military and civilian users. Both P and C/A codes contain data that enable a receiver to determine the range between a satellite and the user.

Superimposed on both the P and C/A codes is a navigation (NAV) message. A NAV message contains the GPS signal transmission time; a handover word used in connection with the transition from C/A to P code tracking; ephemeris data for the particular satellites being tracked; and almanac data for all of the satellites in the constellation, including information regarding satellite health, coefficients for the ionospheric delay model for C/A code users, and coefficients used to calculate universal coordinated time (UCT).

The control segment comprises a master control station (MCS) and a number of monitor stations. The monitor stations passively track all GPS satellites in view, collecting ranging data and satellite clock data from each satellite. This information is passed on to the MCS where the satellite's future ephemeris and clock drift are predicted. Updated ephemeris and clock data are uploaded to each satellite for retransmission in each satellite's navigation message. The purpose of the control segment is to ensure that the information transmitted from the satellites is as accurate as possible.

The GPS is intended to be used in a wide variety of applications, including space, air, sea and land vehicle navigation, precise positioning, time transfer, altitude referencing and surveying. A typical GPS receiver comprises a number of subsystems, including an antenna assembly, an RF (radio frequency) assembly, and a GPS processor assembly. The antenna assembly receives the L-band GPS signal and amplifies it prior to insertion into the RF assembly. A significant factor affecting accuracy of the computed position, velocity or time parameters is the positional geometry of the satellite selected for measurement of ranges. Generally, a best position solution is obtained using satellites having wide angles of separation. Considerable emphasis has therefore been placed on designing antenna systems to receive, with uniform gain, signals from any point on the hemisphere.

The RF assembly mixes the L-band GPS signal down to a convenient IF (intermediate frequency) signal. Using various known techniques, the PRN code modulating the L-band signal is tracked through code-correlation at the receiver. This provides the processing gain needed to achieve a signal-to-noise ratio (SNR) sufficient for demodulating the navigation data and signal transmission time. The Doppler shift of the received L-band signal is also measured through a carrier tracking loop. The code correlation and carrier tracking function can be performed using either analog or digital signal processing.

By differencing the signal transmission time with the time of reception, as determined by the clock of the receiver, the pseudo range between the receiver and the satellite being tracked may be determined. The pseudo range includes both the range to the satellite and the offset of the clock from the GPS master time reference. The pseudo range and Doppler measurements (and the navigation data) from four satellites are used to compute a three dimensional position and velocity fix, which calibrates the receiver's clock offset and provides an indication of GPS time.

In some known receivers, the receiver processor controller (RPC) functions are performed using a computer separate from that on which the navigation functions are performed. In other known receivers, both types of functions are performed by a single computer. The RPC processing and memory functions performed by a typical GPS receiver include monitoring channel status and control, signal acquisition and reacquisition, code and carrier tracking loops, computing pseudo range (PR) and delta range (DR) measurements, determining data edge timing, acquisition and storage of almanac and ephemeris data broadcast by the satellites, processor control and timing, address and command decoding, timed interrupt generation, interrupt acknowledgment control and GPS timing.

U.S. Pat. No. 5,225,842 describes an apparatus and method for computing the position and velocity of multiple low cost vehicle-mounted sensors, monitored and tracked by a central control station. The receiver processor functions are physically separated from the navigation functions and the low rate data interfaces provided between the computers that perform these functions, thus achieving cost saving in the GPS sensor that is employed on board each vehicle.

One type of known GPS receiver is described in U.S. Pat. No. 4,114,155, wherein the position of a receiver responsive to C/A signals derived from multiple, orbiting spacecrafts is determined to an accuracy better than 300 meters. Each of the C/A signals has the same carrier frequency and a different, predetermined Gold code sequence that normally prevents position determination from being more accurate than to within 300 meters. C/A signals transmitted to the receiver are separately detected by cross-correlating received Gold code sequences with plural locally derived Gold code sequences. Four of the detected C/A signals are combined to compute receiver position to an accuracy of 300 meters. To determine receiver position to an accuracy better than 300 meters, the relative phase of internally-derived Gold code sequences is varied over the interval of one chip (i.e., pulse) of each sequence, to derive second cross-correlation values indicative of received and locally-derived Gold code sequences.

The basic approach followed most recently is to receive and process the signals from several of the GPS satellites in order to determine range to each satellite (and relative velocity). With perfect knowledge of range to only three of the GPS satellites, exact receiver position can be determined from the intersection of the three "spheres" induced by the known satellite positions and the derived receiver ranges. With receiver noise and imperfect knowledge of satellite positions, the receiver-satellite ranges can only be estimated. Typically, errors from receiver noise are reduced by (effectively) averaging many range calculations.

In the above most recent approach, the range from a particular satellite is estimated by reading a time stamp from the satellite's data stream (the transmission instant), subtracting this from the reception time, and multiplying the time difference by the speed of light. Any error in satellite and receiver clock synchronization leads to proportional range errors. Because the same clock is used in receiving from all satellites, there is only one unknown receiver clock "bias". By using a fourth (or more) satellite, the clock bias and ranges can be jointly estimated.

At the receiver, the reception time is determined by performing a cross-correlation of the received data with a local replica of the known satellite Gold code, and noting the time of a chosen correlation peak, and its position relative to the time stamp. The satellite signal structures use Code Division Multiple Access (CDMA) so that the above cross correlation is part of the standard GPS receiver processing.

The above-described system that follows the most recent basic approach assumes that each receiver must determine its own position. In the system of the invention, there is a central facility or station that needs the receiver positions and can communicate with the receivers. Each tracked object (e.g., a railcar) carries a GPS-based receiver that processes data from several of the visible GPS satellites. However, the full position determination is not made at the railcar. Instead, only partial processing is done at the railcar and intermediate results are transmitted to the central station. The forms of both the partial processing and intermediate results are chosen to minimize the complexity and energy requirements at the railcars.

The standard GPS system requires that the transmit-time stamps, satellite ephemeris and other correction data be decoded from each satellite's data stream at the tracked object. The receiver is thus required to process data from each satellite long enough (between six and 150 seconds) to synchronize with, and decode, these data. This consumes significant power.

SUMMARY OF THE INVENTION

Briefly, in accordance with a preferred embodiment of the invention, a method for identifying location of an asset or object to be tracked comprises measuring data related to propagation time differences between signals transmitted from a plurality of satellites and received at the object to be tracked, transmitting the data to a central station, and calculating, at the central station, the location of the object to be tracked based upon the transmitted data. The data received at the object to be tracked may include data identifying a respective associated satellite by, for example, a satellite identification number, such that the step of calculating the location of the object to be tracked is thereupon based further upon the satellite identification numbers.

In another preferred embodiment, a reduced-power GPS-based system for tracking location of an asset or object from a central location comprises a central station at the central location, and an object to be tracked which includes means for receiving signals from at least four GPS satellites, first processor means for processing data from the receiver means propagation time differences for the signals, and transmission means for transmitting the processed data to the central station. Second processor means situated at the central station determine location of the object based upon the data received from the transmission means.

In still another preferred embodiment, a reduced-power GPS-based system for tracking multiple objects from a central location comprises a central station at the central location, and a plurality of objects to be tracked. Each of the objects includes receiver means containing an antenna for receiving signals including data related to the propagation time differences of the signals from at least four GPS satellites, first processor means for calculating a receiver code word phase for each of the satellites based upon the signals received by the receiver means, and transmission means for transmitting the code word phase to the central station. Second processor means are provided at the central station for determining the signal propagation times between the plurality of satellites and each of the tracked objects based on the receiver code word phase transmitted by the respective object and for determining from the signal propagation times the location of each respective one of the objects.

In another preferred embodiment, a reduced-power GPS-based system for tracking location of multiple objects from a central location comprises a central station at the central location, and an object to be tracked which includes means for receiving signals including data related to propagation time differences of said signals from at least four GPS satellites, first processor means for calculating a receiver code-time offset for each of the satellite signals and for determining the receiver code period for each signal, and for determining identification numbers of the at least four GPS satellites, and transmission means for transmitting the receiver code-time offsets, code periods, and identification numbers to the central station. Second processor means at the central station determine the signal propagation times between the plurality of satellites and the tracked object and determine location of the object based upon the receiver code-time offsets, code period, and satellite identification numbers transmitted by the transmission means.

In still a further preferred embodiment, a reduced-power GPS-based system for tracking location of an object from a central location comprises a central station at the central location, and an object to be tracked which includes means for receiving transmission signals from at least four GPS satellites, first processor means for calculating a receiver bit phase for each of the satellite signals based upon the signals received by the receiver means, means for keeping track of time at the object, and transmission means for transmitting the bit phase signals and time signals to the central station. Second processor means are provided at the central station for determining the signal propagation times between the plurality of satellites and the object and for determining location of the object based upon the bit phase and time signals transmitted by the transmission means.

Utilizing the present invention, power consumption and calculation complexity at the tracked object are reduced relative to that for a standard GPS receiver. Arrival time differences between satellite signals are measured at the tracked object and this information is relayed to the central station via the separate communications link. Satellite data streams need not be decoded at the tracked object.

The central station thereby necessarily determines the location of the object to be tracked. Because the receiver front end and data processor use significant power only when processing, the receiver power can be dramatically reduced by being "active" only long enough to get accurate time-difference measurements. This can be less than one second and requires no GPS data-frame synchronization because of the nature of the signals. For example, assuming that the tracked object is a railcar, new railcar locations typically are needed only as frequently as 15 minutes. Thus the receiver energy used is reduced in direct proportion to the reduction of "active" receiver time. Moreover, receiver complexity and cost can be reduced by replacing the advanced microprocessor employed in current GPS receivers with a simpler one that is matched to the arrival-time differencing tasks.

In accordance with the invention, one object is is to provide a GPS-based asset tracking system in which processing is performed at a location remote from the tracked assets and based upon specific recognizable variables.

Another object is to provide a GPS-based asset tracking system which requires minimal energy at the tracked assets.

BRIEF DESCRIPTION OF THE FIGURES

The features of the invention believed to be novel are set forth in the appended claims. The invention, however, together with further objects and advantages thereof, may best be understood by reference to the following description taken in conjunction with the accompanying drawing(s) in which:

DETAILED DESCRIPTION

The present invention is directed to a system and method for reducing the power and complexity requirements of a local GPS receiver, which can be carried by a railcar, by effectively requiring only measurement of arrival-time differences between a plurality of GPS satellite signals. Data related to these time differences are transmitted to a central station where the majority of calculations required to determine the receiver (railcar) location are performed. In the preferred embodiments, a standard CDMA receiver is employed with radio frequency/intermediate frequency (RF/IF) front end and Gold-code cross correlators.

Figure 1:
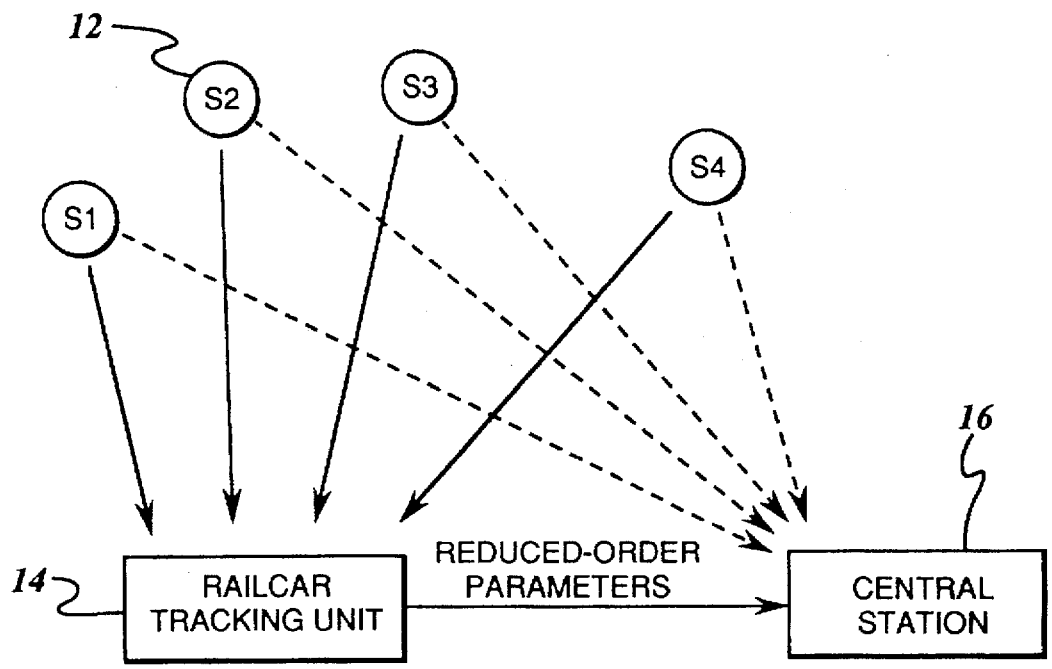
FIG. 1 is a block diagram of a remote tracking system in accordance with the present invention.

In FIG. 1, the invention is shown as comprising a plurality of GPS satellites 12, an object to be tracked, such as a railcar carrying a tracking unit 14, and a central station 16. Although the invention is herein described in the context of a railcar, the teachings of the invention are applicable to a variety of objects which may be tracked by a GPS or satellite-based system. With respect to the GPS signal format, accurate timing of GPS signals is critical and is monitored by central station 16.

Each satellite 12 includes its own set of clock correction parameters within its data stream. These allow a receiver to ascertain the absolute transmission timing for each satellite with respect to a common GPS standard time. A particular satellite's clock may drift relative to those of other satellites. The GPS system control monitors these offsets and periodically includes them in the satellite's data stream. The clock time offsets are not needed at the individual receivers and can be determined at central station 16 by utilizing a standard GPS receiver there or at a remotely controlled site.

Figure 1A:
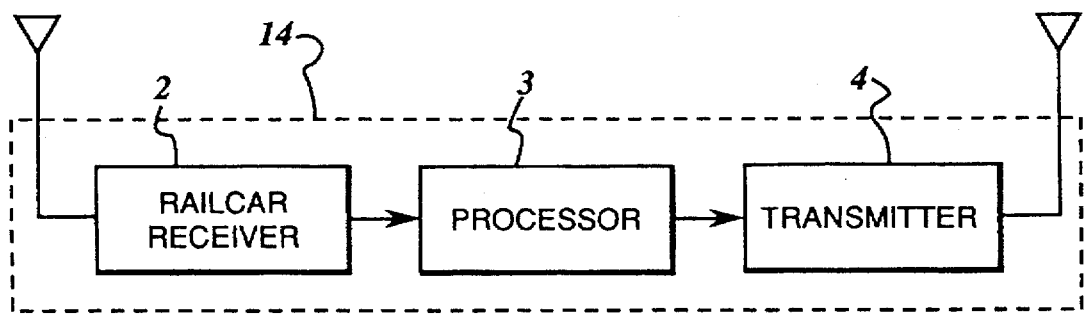
FIG. 1A is a block diagram of a railcar tracking unit on an object to be tracked in accordance with the invention.

As shown in FIG. 1A, railcar tracking unit 14 is actually comprised of a railcar receiver 2 responsive to the signals from GPS satellites 12, a processor 3, and a transmitter 4. The received signals are processed in processor 3 to ascertain and utilize propagation time differences among the signals received from GPS satellites 12. The processed signals are furnished to transmitter 4 from whence they are transmitted, as reduced order parameters, to central station 16.

Figure 1B:
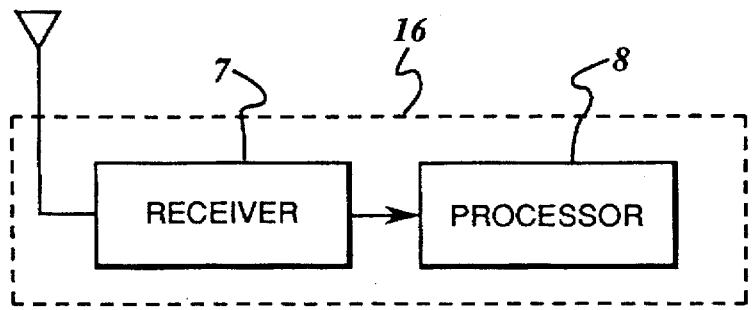
FIG. 1B is a block diagram of the transmitter at the central station of the remote tracking system of the invention.

As shown in FIG. 1B, central station 16 includes a receiver 7 responsive to signals from transmitter 4 of tracking unit 14 (FIG. 1A) and a processor 8 responsive to receiver 7 for determining location of tracking unit 14.

Figure 2:
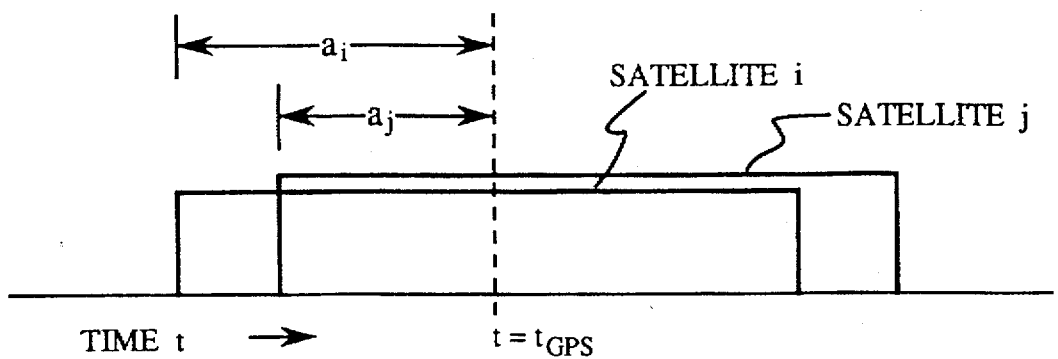
FIG. 2 illustrates the long time-scale data frame relationship between a GPS standard time mark and two satellite data frames in accordance with the present invention.

In the long time scale data frame shown in FIG. 2, $a_i$ is the frame time offset for satellite i. A value $a_j - a_i$ is the time offset between transmitted signals from two satellites, i and j.

Figure 3:
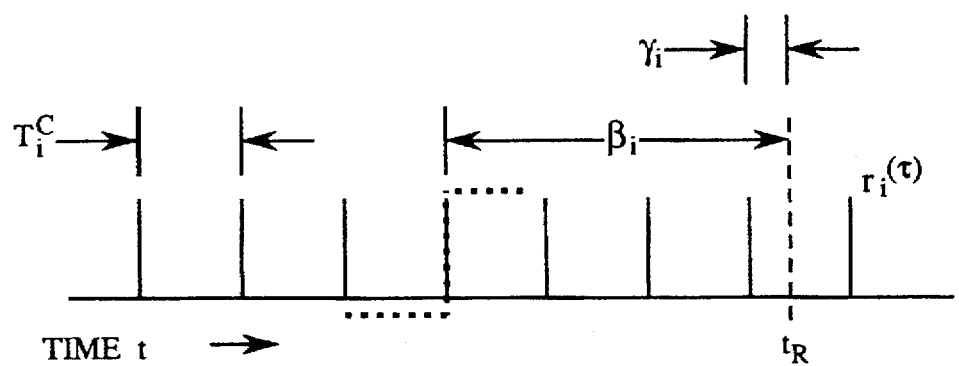
FIG. 3 illustrates a typical Gold-code correlation output signal on a short time scale when the proper code replica is used at the local station receiver.

A Gold-code correlator output waveform $r_i(\tau)$ for satellite i is illustrated in FIG. 3 from the perspective of the railcar receiver. Each correlation-peak location respectively marks the beginning of a new Gold code cycle in the received waveform. Each Gold code cycle is 1 ms long and comprises 1023 binary Gold code "chips". Furthermore, there are 20 code cycles for each encoded navigation data bit. FIG. 3 also illustrates, by a dotted line, a typical bit-boundary position.

With respect to a particular time $t_R$ at a railcar receiver, the receiver code-time offset for satellite i is $\gamma_i$. The receiver code-time offset is the time elapsed to a time $t_R$ from the beginning of the code word (cycle) in which $t_R$ falls. Similarly, the receiver bit-time offset $\beta_i$ is the time elapsed to time $t_R$ from the beginning of the bit in which $t_R$ falls. The satellite-railcar radial velocity component varies for different satellites and this results in a relative waveform expansion or compression (Doppler) at the railcar. Thus the observed code and bit periods are satellite dependent. The code and bit periods observed at the railcar for satellite i are designated as $T_i^C$ and $T_i^B$, respectively.

Frequently, the railcar receiver will use satellite signals that are not visible from (i.e., cannot be received by) the central station. This presents no problem because the satellite clocks drift slowly (less than five nanoseconds error per hour). If, at the railcar receiver, time differences are calculated using a satellite that is not visible at the central station, then, at the central station, the last calculated clock offset for that satellite can be used (or extrapolated, based on past drift rate) until that satellite is again visible. As an alternative, central station 16 (FIG. 1) could communicate with standard GPS receivers strategically situated to guarantee satellite visibility.

A key feature of the present invention is the provision of a method for determining location of the object (here, a railcar) to be tracked. In a first method ("method 1"), the object's location is accurately determined from propagation time differences between at least five satellites' signals received at the tracked object. This method requires no measurement of time at the tracked object. The propagation time difference between signals from satellites i and j is defined as $\Delta_{ij}=\tau_j-\tau_i$, where $\tau_i$ is the signal propagation time from satellite i to the railcar. These propagation times are not directly measured at the receiver but are calculated from received code word or bit phases, as described below (see equations 8 and 9). The satellite-railcar ranges and propagation time differences are related by the equation $$R_i(t, t-\tau_i)-R_1(t, t-\tau_1)=C\Delta_{1i}(t), \quad (1)$$

or:

$$R_2(t, t-\tau_2)-R_1(t, t-\tau_1)=C\Delta_{12}(t)$$

$$R_3(t, t-\tau_3)-R_1(t, t-\tau_1)=C\Delta_{13}(t)$$

$$R_4(t, t-\tau_4)-R_1(t, t-\tau_1)=C\Delta_{14}(t)$$

$$R_5(t, t-\tau_5)-R_1(t, t-\tau_1)=C\Delta_{15}(t)$$

where $R_i(\ )$ is a function of the parameters in its argument and is discussed below. In equation (1), t is the common time at which the signals are measured at the receiver, C is the speed of light, and $$R_i(t,t-\tau_i)=[(x(t)-x_i(t-\tau_i))^2+(y(t)-y_i(t-\tau_i))^2+(z(t)-z_i(t-\tau_i))^2]^{1/2} \quad (2)$$

is the range from the i'th satellite to the railcar receiver. Also, $x_i$, $y_i$ and $z_i$ are time-dependent coordinates for satellite i and are specified by the satellite's ephemeris equations. For satellite i, the signal received at time $t=t_R$ was transmitted at time $t_R-\tau_i$, which is now defined as $t_i^T$. Time $t_R$ is identical for all of the satellites. Furthermore, the propagation times are related by $$\tau_i=\tau_1+\Delta_{1i}. \quad (3)$$

For any particular measurement time $t=t_R$, equation (1) can be rewritten as $$R_2(x,y,z,t_1^T-\Delta_{12})-R_1(x,y,z,t_1^T)=C\Delta_{12} \quad (4)$$

$$R_3(x,y,z,t_1^T-\Delta_{13})-R_1(x,y,z,t_1^T)=C\Delta_{13}$$

$$R_4(x,y,z,t_1^T-\Delta_{14})-R_1(x,y,z,t_1^T)=C\Delta_{14}$$

$$R_5(x,y,z,t_1^T-\Delta_{15})-R_1(x,y,z,t_1^T)=C\Delta_{15}$$

The corresponding satellite transmission times are needed to properly determine the satellite locations needed in equation (2). From equations (2), (3) and (4), the object coordinates x, y, z and the transmission time $t_1^T$ form the only unknowns. Yet the time delay differences in equation (1) do not have to be calculated with reference to satellite (1); i.e., any satellite pairing will be satisfactory as long as the four equations in (1) utilize unique pairings.

Using these simultaneous equations at central station 16 (FIG. 1), four time delay differences determine a point at the intersection of four hyperbolic sheets in three dimensional space as well as the unknown transmit time, $t_1^T$. The other satellite transmission times $t_2^T$, $t_3^T$, $t_4^T$, and $t_5^T$ are then found from the equation:

$$t_i^T=t_1^T-\Delta_{1i}. \quad (5)$$

The resultant values are utilized to determine the satellite locations needed in equation (2). The nonlinear equations (4) are readily solved with standard techniques using iteration. It is not necessary that time $t_R$ be measured at the railcar receiver. This value can be found, if desired, at the central station from the equation:

$$t_R=t_1^T+R_1/C. \quad (6)$$

In the present invention, the propagation time differences $\Delta_{ij}$ are not directly measured at the railcar receiver. Instead, only the code or bit phases associated with reception time $t_R$ are measured, and these data, or their differences including the satellite identifications, are transmitted to the central station. This permits the railcar receiver to focus only on cross correlation and to operate long enough to get a sufficient SNR (Signal-to-Noise Ratio) through averaging. In general, the averaging times are so brief that any Doppler shifts can be considered as constants. Thus the bit and code periods are constant during these periods. Railcar locations can be determined at the central station by calculating the true differential delays from the measured phases, as described below, and using them in equations (1) through (5).

Figure 4:
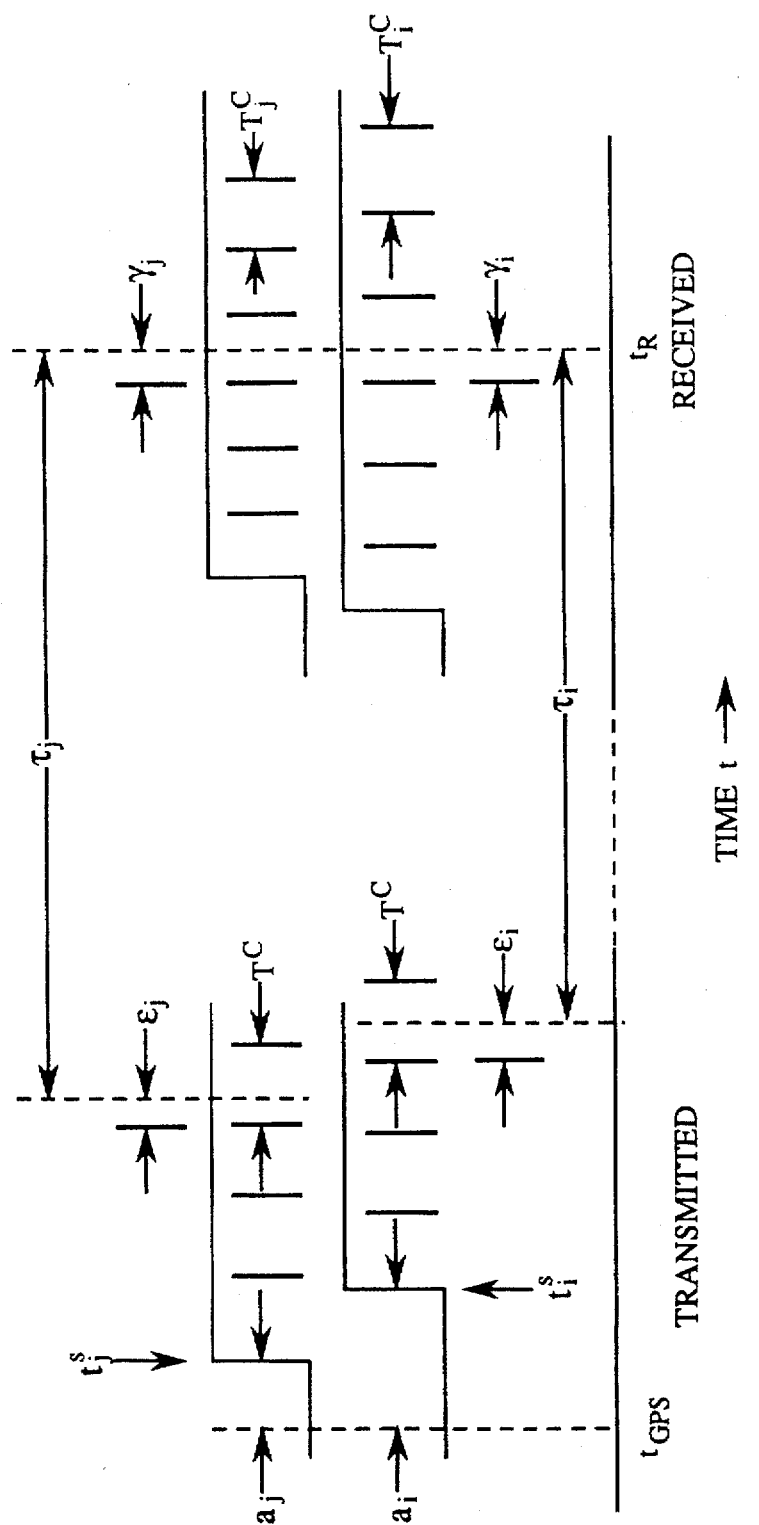
FIG. 4 illustrates the time delay relationships of the transmitted and received signals.

In determining the propagation time difference between two satellite signals, it is assumed that the Doppler shift is constant locally, i.e., that the satellite-railcar propagation delay changes linearly with time. Using this assumption, a particular relative position in a received code word or data-bit cycle corresponds to the same relative position in the associated transmitted code word or data-bit cycle. From the previous definitions, and as shown in FIG. 4, for each satellite i, j, etc., $$t_R=t_i^s+T^C(m_i+\mu_i)+\tau_i. \quad (7)$$

Pursuant to equation (7), $t_i^s$ is the time when the start of a currently received frame was transmitted, $m_i$ is the integer number of code periods between time $t_R$ and the beginning of the received data frame, and $\mu_i$ is the receiver code word phase at time $t_R$ and is defined as $$\mu_i=\gamma_i/T_i^C \quad (8)$$

where $\gamma_i$ is the receiver code-time offset at the receiver, and $T_i^C$ is the code period (at time $t_R$) in the received data frame. $T^C$ is the common code period at all transmitters. Because the Doppler shift is constant, it is true that $$\epsilon/T^C=\gamma_i/T_i^C \quad (9)$$

so the relative code word phase in the transmitted waveform at time $t_R-\tau_i$ is equal to $\mu_i$ that was measured at the receiver at time $t_R$. From equation (7), the propagation time difference between signals from satellites i and j is $$\Delta_{ij}=\tau_j-\tau_i=a_j-a_i+T^C(m_i-m_j)+T^C(\mu_i-\mu_j) \quad (10)$$

which utilizes the equation $t_i^S=t_{GPS}+a_i$ for each i. At the central station, $a_i$, $a_j$ and $T^C$ are known, $t_{GPS}$ is the chosen reference time, and $\mu_i$ and $\mu_j$ are received from the tracked object as measurements. The integers $m_i$ and $m_j$ are unknown and yield ambiguity as discussed below. At the receiver, time $t_R$ can be chosen to align with the first satellite's received code word boundary. Then $\mu_1=0$ by convention and the other four phases can be sent to the central station. In this way, the central station can know the individual phase values as well as their differences. Knowledge of each phase value at the central station constrains each unknown associated transmission time to be on a lattice of time points that have that phase value.

While the above discussion illustrates how the several satellite propagation time differences can be deduced from receiver code word phase measurements, as an alternative, receiver bit phases can be measured. In this instance, $\mu_i$ of equation (8) becomes the bit phase when $\gamma_i$ is replaced by $\beta_i$, and $T_i^C$ is replaced by $T_i^B$ such that $\mu_i=\beta_i/T_i^B$. A relationship similar to equation (9) also holds for bit phases. Finally, in equation (10), $m_1$ and $m_i$ become the unknown integer number of bit periods. In either instance, the unknowns $m_i$ and $m_j$ cause a periodic ambiguity in propagation time difference $\Delta$ that must be resolved. This ambiguity has a period of approximately one millisecond for code periods and 20 milliseconds for bit periods.

Because each possible propagation time difference value induces a three-dimensional hyperbolic sheet for the railcar location solution, the ambiguity in $\Delta$ induces multiple sheets for each value of $\Delta$. On an assumed flat earth, the sheets from just one phase difference form a set of hyperbolas with the positions of satellites i and j as the foci. Phase differences from other satellite pairs induce different hyperbola sets. The only feasible railcar location solutions are those where there is a congruence of one hyperbolic sheet from each participating satellite pair. With ambiguous time differences from four satellites, only a small set of possible joint ambiguity images yield intersecting hyperbolas near the earth's surface, and the set is further reduced as more satellites are used.

Figure 5:
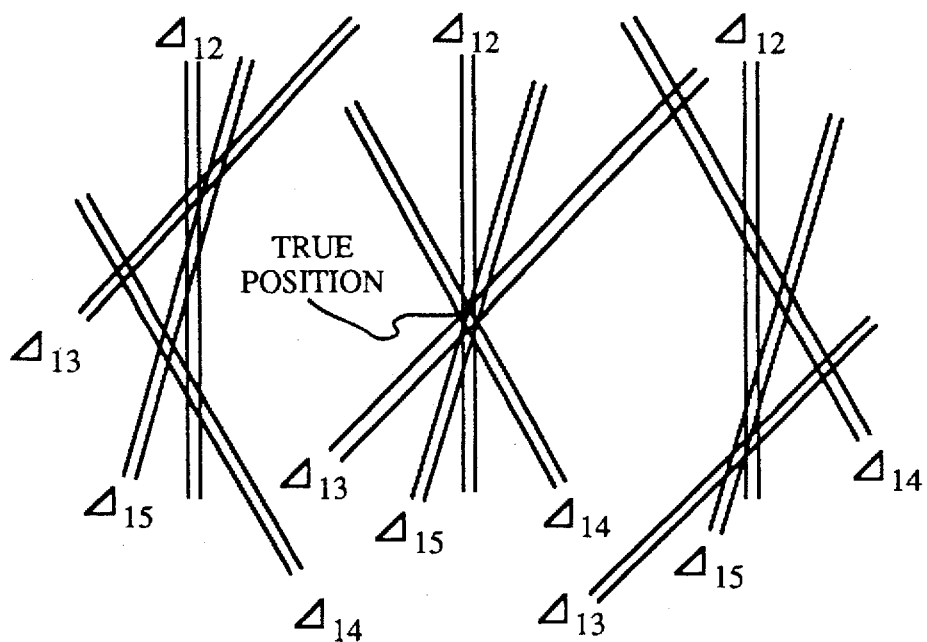
FIG. 5 illustrates a plurality of intersecting time-difference solution regions on the surface of the earth.

Time-delay difference and satellite location accuracies are such that the location solution regions from each satellite pair are very narrow relative to the ambiguity spacing, as shown in FIG. 5. Thus the several ambiguous time delay differences yield a small set of possible railcar locations.

The use of bit-time differences provides advantages over code-time differences because the former yield a smaller number of possible location solutions. The 20 millisecond period for bit-time differences always yields a location ambiguity spatial period of at least 1500 miles at the earth surface, while for code-time differences the ambiguity spatial period is only 75 miles. This shortest ambiguity period assumption is derived by assuming the two satellites involved are on the horizon in opposite directions. For railcar tracking applications, car locations will be known a-priori to within 1500 miles, so a 1500 mile ambiguity is not a problem. Receiver bit phases, however, are slightly complicated to derive because the satellite's binary data stream is NRZ coded.

Using an NRZ code sequence, a sequence of identical bits has no transitions and bit locations are not visible. However, with GPS data, such sequences are very short, so that bit edges are readily observed. Once a single bit transition has been observed, the receiver bit phase for the chosen time $t_R$ is readily deduced because the code period is observed and there are always 20 code cycles per bit period. Furthermore, each bit boundary coincides with a code word boundary.

In order to solve equation (4) for the railcar receiver location, the propagation time delay differences are first found, as from equation (10). In equation (10), $(m_i-m_j)$ is the unknown integer part of the code or bit period offset between the signals received from satellites i and j. For a given measurement of $\mu_i$ and $\mu_j$, equations (10) and (4) yield a different location solution for each value of $(m_i-m_j)$. Conceptually, each integer value of $(m_i-m_j)$ must be tried, and the resulting position solution must be checked against known bounds for validity. In earthbound (e.g., railcar) applications, altitude is a simple bound against which each position solution can be checked. Also, railcar velocities are constrained, so that new locations cannot be extremely different from previous locations.

Most of the ambiguous solutions are at invalid altitudes, far from the earth's surface. To avoid wasteful calculation, it is desirable to directly limit the values of $(m_i-m_j)$ that are used in equation (10). The GPS satellite-earth geometry constrains each time $t_i$ to be between 58.5 and 79.9 milliseconds (ms). This is true because GPS satellites orbit at approximately $25\times10^3$ km above the earth's center so that the delay from directly overhead is 58.5 ms while the delay from a satellite on the horizon (nearly 4000 miles farther away) is 79.9 ms. The delay difference between two satellites is therefore constrained to the interval $[-21.4, 21.4]$ milliseconds. At the central station, equation (10) is readily used to deduce values of $(m_i-m_j)$ that satisfy this interval constraint. If code phases are measured, there are approximately 43 feasible values of $(m_i-m_j)$ for each measured $(\mu_i-\mu_j)$. Thus there are 43 values for each $\Delta_{ij}$ in equation (4). If bit phases are measured, there are only 2 or 3 feasible values for each propagation time difference $\Delta_{ij}$ and the resulting list of possible railcar locations will be much shorter.

To summarize the foregoing object-tracking method ("method 1"), five satellite signals must be received. Five receiver code word or bit phases are measured, as are the associated satellite identification numbers, and these are sent to the central station. From these measurements a list of feasible railcar locations is determined at the central station. The basic steps are:

1. Phases $\mu_1$ through $\mu_5$ are measured along with their corresponding satellite numbers and these data are sent to the central station. The measured phases can be code word phases in the simplest receiver, or data-bit phases in a slightly more complex receiver. Bit phase could be specified as code word phase plus an integer number of code words offset from the bit transition.

2. A standard GPS receiver at the central station determines satellite transmission offsets $a_1$ through $a_5$ that are valid around the time the receiver measurements are received at the center. Validity of each satellite ephemeris equation is determined for the same time period.

3. At the central station, reasonable values for the integer offsets $(m_1-m_j)$ for j from 2 through 5 are selected, and equation (10) is used to calculate $\Delta_{1j}$ for j from 2 through 5.

4. At the central station, an initial value for $t_1^T$ is chosen and equation (5) is used to find corresponding values for $t_i^T$ for i from 2 through 5. The value of $t_1^T$ is constrained such that the transmitted bit or codeword phase at $t_1^T$ has the measured phase, $\mu_1$. The integer $m_1$ is indirectly specified when choosing a $t_1^T$ that satisfies the above constraint. At the central station, the initial value for transmit time $t_1^T$ may be set to an approximation of the receiver message time $t_R$, if known. In a railcar-tracking application, time $t_R$ could be known to within several minutes at the central station (without any communication of time values).

5. Standard iterative methods are used with equations (1) and (2) in order to solve for the railcar receiver (x, y, z) position and transmission time $t_1^T$. In equation (2), the ephemeris equation for each satellite is included in the iteration. The last reported location can be used as the initial values for x, y, and z in the iteration.

6. Steps 3 through 5 are then repeated for each feasible combination of integer offsets ($m_1$–$m_j$) for j from 2 through 5. This yields a list of potential railcar receiver location solutions.

An advantage of the tracking method described above is that requirements for receiver clock accuracy are minimal. Railcar time is not part of the measurement set.

The present invention may alternatively employ a second method ("method 2") for determining location of an object being tracked. The second method is similar to the first method, except that only four satellites are used and the railcar receiver message time $t_R$ must be made known to the central station, (e.g., measured and transmitted to the central station). By using four satellites, only three independent propagation time differences can be obtained from the receiver code word or bit-phase measurements. To determine the railcar location, the time at which these propagation time differences are valid must be known. More specifically, as shown in FIG. 4, the transmission times $t_i^T$, for i from 1 to 4, must be determined so that the satellite position, (associated with the common reception time $t_R$) can be determined. In a manner similar to the first tracking method, the railcar receiver location is determined from the following three equations:

$$R_2(x,y,z,t_1^T-\Delta_{12})-R_1(x,y,z,t_1^T)=C\Delta_{12} \quad (11)$$

$$R_3(x,y,z,t_1^T-\Delta_{13})-R_1(x,y,z,t_1^T)=C\Delta_{13}$$

$$R_4(x,y,z,t_1^T-\Delta_{14})-R_1(x,y,z,t_1^T)=C\Delta_{14}.$$

In equation 11, the $\Delta_{1j}$ terms are derived from the measured code word or bit phases with ambiguities as in the first tracking method. Also as in the first method, ($t_1^T-\Delta_{1i}$) is the transmission time from the i'th satellite corresponding to reception time $t_R$. This transmission time determines the satellite location from the ephemeris equations, and the satellite locations are needed to determine the ranges in equations (11). The $\Delta_{1i}$ values are known at the central station from the received measurements and equation (10). Furthermore, time $t_1^T$ is related to time $t_R$ by $$t_1^T=t_R-\tau_1(x,y,z,x_1(t_1^T),y_1(t_1^T),z_1(t_1^T)). \quad (12)$$

Here $\tau_1$ is the GPS signal propagation delay from satellite 1 and depends, as shown, on location of the object being tracked, and satellite location. The satellite location ($x_1$, $y_1$, $z_1$) depends, in turn, on time $t_1^T$. Therefore, if time $t_R$ and the satellite ephemeris equations are known, then time $t_1^T$ depends only on the location of the object being tracked. For a given location of the object being tracked, equation (12) can be solved iteratively for time $t_1^T$. After convergence, the value of $t_1^T$ can be modified to the nearest point of the time grid induced by equations (8) and (9) and the known (measured) value of $\mu_1$ so as to obey the previously mentioned lattice constraint. To speed convergence, this constraint can be applied after each iteration. Equations (11) and (12) together form a system of nonlinear equations with object location (x, y, z) as the only unknowns, and these equations can be solved using standard iterative techniques.

In many railcar tracking applications (e.g., when the railcar is traveling), extreme accuracy is not required. In such cases, $t_i^T$ can be approximated by $t_R-(79.9-58.5)/2$. As stated earlier in the description of the first tracking method, the GPS-signal transmission times ($t_i^T$) must lie between $t_R-79.9$ ms and $t_R-58.5$ ms. This yields a $t_1^T$ uncertainty of 21.4 ms if $t_R$ is known. The satellites travel at approximately 3.49 km per second so that a $t_i^T$ uncertainty of 21.4 ms yields a satellite location (x, y or z) uncertainty of, at most, 74.8 meters, which translates directly to a similar uncertainty in railcar receiver location. This may provide sufficient accuracy for most railcar-tracking applications. If greater accuracy is desired, equation (12) can be included in the iterative solution of equation (11) to determine location of the object being tracked. The initial value for $t_1^T$ can be set equal to $t_R$ and equation (11) iterated to solution for (x, y, z). This result and the initial value for $t_1^T$ can then be used to initialize an iteration for solving equation (12). This yields an improved value for $t_1^T$ which can be used with the previous (x, y, z) solution to initialize another iterative solution of equation (11). This cascade of iterations will rapidly converge to the correct railcar location, subject to the ($m_i$–$m_j$) induced ambiguities.

Small errors in $t_R$ can be tolerated because $t_1^T$ must obey the previously-mentioned lattice constraint. Thus if the received codework or bit phases $\mu_i$ are measured at time $t_R$, but the measured time is actually reported as $t_R$ plus some error $\epsilon$, the railcar location will be accurately calculated for time $t_R$ if the value of $\epsilon$ is less than one-half of the code word time ($data-bit$) period. If desired, the correct value for $t_R$ can be determined following completion of the iteration using the following equation:

$$t_R=t_1^T+R_1/C. \quad (13)$$

Figure 6:
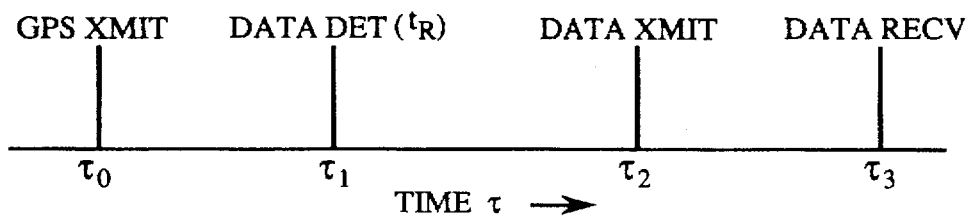
FIG. 6 illustrates tracked object message timing diagrams in accordance with the present invention.

In performing this method of tracking an object, it is assumed that the reception time $t_R$ for the railcar receiver can be accurately measured and used to find the relevant satellite transmission times. This is easily done if the object being tracked includes an accurate clock and its time reading at $t=t_R$ is sent to the central station. Alternatively, time $t_R$ can be determined at the central station by determining the time of data arrival at the central station and using this as a reference. As shown in FIG. 6, data transmitted from a GPS satellite at time $\tau_0$ is detected at the railcar receiver at time $\tau_1=t_R$, is transmitted to the central station at time $\tau_2$, and is received by the central station at time $\tau_3$. The central station maintains an accurate clock so that the value $t_R$ can be determined if both ($\tau_3-\tau_2$) and ($\tau_2-\tau_1$) are known. The delay ($\tau_2-\tau_1$) can be easily recorded by an inexpensive timer located at the railcar receiver and can be transmitted as data to the central station. The communication delay ($\tau_3-\tau_2$) is dependent upon the data communication network and may be known at the central station where reception time $t_R$ may then be calculated using the formula:

$$t_R=\tau_3-(\tau_3-\tau_2)-(\tau_2-\tau_1). \quad (14)$$

Figure 7:
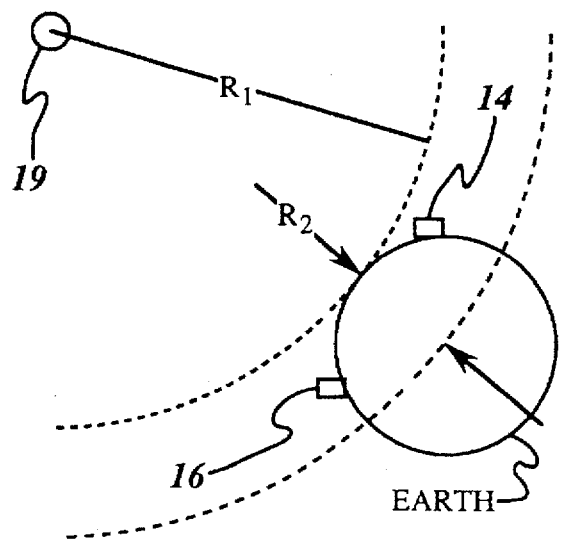
FIG. 7 illustrates tracked object location-dependent communication delay.

As indicated in FIG. 7, there are some situations in which the data communication may be made via a satellite link. Assuming the use of a geostationary satellite 19 for the data link, transmissions out to and back from the satellite will experience a delay which depends on the locations of central station 16, railcar receiver 14 and satellite 19. This delay will be bounded between $\phi_1=2R_1/C$ and $\phi_2=2(R_1+R_2)/C$ as can be seen from FIG. 7, where C is the speed of light, $R_1$ is the distance from satellite 19 to the surface of the earth and $R_2$ is the earth's radius. With $R_1$ approximately 38,623 km and $R_2$ approximately 6,437 km, the delay uncertainty is approximately 46 ms. During this interval, the GPS satellites move 174 meters at their speed of 3.78 km per second. Thus the railcar locations will have an additional error if this delay uncertainty is not resolved.

If a more accurate railcar location is required, the uncertainty in geostationary satellite delay (due to uncertain railcar location) can be eliminated with an iteration scheme such as that discussed earlier (for the GPS signal delays). Initially, the railcar location is calculated at the central station by assuming a particular feasible value for the communication delay $(\tau_3-\tau_2)$. With the new railcar location and the known satellite 19 and central station 16 positions, the communication delay is recalculated. This corrected delay is then used in equation (14) to correct the value $t_R$. The new value of $t_R$ is used, as described earlier, to find a railcar location. This iteration can continue until little change in railcar location is observable.

For accurate results from this approach, the data storage delay $(\tau_2-\tau_1)$ must be short enough such that the railcar receiver clock yields an accurate storage delay measurement. In a preferred embodiment, the railcar will collect time-difference data approximately every 15 minutes and report these data to the central station hourly. Thus the storage delay $(\tau_2-\tau_1)$ for the first measurement set could be up to 60 minutes, or 3600 seconds. An inexpensive receiver clock may keep time to one part in one million, so that a 3.6 ms error may accrue in 3600 seconds. This error is directly reflected in the measured value of $t_R$. If the residual error in $t_R$, due to receiver clock drift, is kept to less than one-half of the code word or data-bit period, the iteration method described above will reduce the residual railcar location error to zero.

To summarize this second object-tracking method ("method 2"), four satellite signals must be received. Four receiver code word or bit phases are measured, as are the associated satellite identification numbers and the single measurement time, and these are sent to the central station. The basic steps are:

1. Code word or bit phases $\mu_1$ through $\mu_4$ and their associated satellite numbers are measured at reception time $t_R$. These data, including the measurement time $t_R$, are sent to the central station. The bit phase can be specified as code word phase plus an integer number of code words offset from a bit transition. If an accurate clock is not available at the railcar receiver, the data-storage time $(\tau_2-\tau_1)$ at the railcar receiver is sent instead of the actual measurement time.

2. If storage time is measured at the object being tracked and sent to the central station, then the time of data reception $(\tau_3)$ at the central station is determined and used with storage delay $(\tau_2-\tau_1)$, and with the known bounds on transmission delay between the object being tracked and central station $(\tau_3-\tau_2)$, to estimate the measured common reception time $t_R$ from equation (14).

3. A standard GPS receiver is used at the central station to determine satellite transmission offsets $a_1$ through $a_4$ and the satellite ephemeris equations that are valid near the measured reception time $t_R$. Because these parameters change relatively slowly, and because the delay between a GPS satellite and the object being tracked is short, these parameters will be valid at the several satellite transmission times.

4. At the central station, reasonable values for the integer offsets, $(m_1-m_j)$ for $j$ from 2 through 4 are selected, in view of limitations on these offsets that are induced by satellite-earth geometry, prior object location, object velocity limits, etc. Equation (10) is used to calculate propagation time difference $\Delta_{1j}$ for $j$ from 2 through 4.

5. At the central station, an initial value for time $t_1^T$ is chosen based on $\mu_1$, and on limitations on the communication delay $(\tau_3-\tau_2)$ and bounds on the GPS signal travel delays $(\tau_i)$. An effective simple initial value is $t_1^T=t_R$.

6. Equation (5) is then used to calculate corresponding values for $t_i^T$ for $i$ from 2 through 4.

7. Standard iterative methods are then used to solve equation (11) for railcar receiver location (x,y,z). Because the values $t_i^T$ are fixed, the ephemeris equations are evaluated only once during this iteration.

8. For higher accuracy, the new (x, y, z) result is used with equation (12) to iteratively solve for an improved value of $t_1^T$. This can be done either after step 7 has converged, or after each iteration of step 7.

9. Steps 6 through 8 are repeated, terminating after step 7 if the new position (x, y, z) is substantially unchanged.

10. Steps 4 through 9 are repeated for each feasible combination of integer offsets, $(m_1-m_j)$ for $j$ from 2 through 4. This yields a list of potential railcar location solutions.

An advantage of this second method of object tracking is that only four satellite signals must be received. Furthermore, the iteration for finding railcar location is less time-consuming because the search for the correct GPS transmission times is substantially eliminated.

For some communication methods, the communication delay time cannot be determined with sufficient accuracy. In such cases, other methods for determining receiver and transmission times must be used. One approach is to utilize a unique mark (unique over a sufficient period) in any one GPS satellite's data stream as a time reference at the tracked object, and to measure reception or receiver time $t_R$ relative to this received mark. Because the mark is unique, it can be found in the GPS signal received at the central station and its transmission time can be determined accordingly. Hence the transmission time associated with reception time $t_R$ can be found by adding the measured offset to the mark time. All other satellite transmission times $t_i^T$ can then be found from the known offsets $a_i$ at the central station. Utilizing equations (11) and (13), the railcar receiver locations and associated receiver times are calculated.

The GPS telemetry-word preamble (TWP) is a specific eight-bit sequence (10001011) that is transmitted at the beginning of every six-second subframe from each satellite and is a standard synchronization mark. This sequence cannot be falsely replicated by any prefix or postfix of up to six bits in length. If a short periodic receiver window is synchronized with a signal event such as the TWP from one of the satellites whose data is to be processed, and this window is used to occasionally "awaken" or activate the railcar receiver for TWP-synchronized GPS signal processing, little or no extra power will be required at the railcar receiver to support learning the transmission times at the central station. This TWP windowing scheme is useful if the uncertainty in satellite transmission times is less than six seconds. Initial window synchronization may require up to a full six seconds of GPS data processing to ensure TWP acquisition but, once acquired, the window can easily be tracked by noting the position of each TWP in its surrounding window and altering the window timing to keep the TWP centered. With inexpensive clocks at the railcar receiver, the window can drift on the order of only 3.6 ms per hour. If the signal TWP region is also used for the time-difference processing, then the window can drift only on the order of 3.6/4 ms over the 15 minute inter-measurement interval. Since the TWP sequence is unique within ±6 bit periods (120 ms), use of a 100 ms window ensures that the TWP will not be missed or falsely recognized.

If the transmission delay to the central station has uncertainty greater than six seconds, the TWP windowing scheme can be augmented with GPS time-stamp decoding at the receiver. The GPS time stamp is encoded in the data stream at a fixed short delay from the TWP word. The TWP window can be used to enable time-stamp decoding, and the time stamp can be sent to the central station as an estimate of the receiver time $t_R$. As an alternative, time $t_R$ can be chosen at the railcar receiver to coincide with the TWP word boundary on satellite channel number 1, and the following time stamp can be decoded and sent to the central station. The correct value for time $t_1^T$ is then easily found at the central station as the value of the time stamp prior to that from the receiver.

The above railcar receiver windowing scheme need be implemented only on one of the satellite signals in order to determine receiver time $t_R$. However, if a separate TWP receiver window is formed, respectively, for each satellite signal, then all time-delay ambiguities associated with code or bit periods are readily resolved by noting the TWP-relative time at the end of the correlation process for each signal. This simplifies processing at the central station at the expense of extra window processing and receiver "on" time at the railcar receiver.

A further method for determining time is to broadcast time signals via a separate channel accessible to the railcar receivers. For example, time signals may be transmitted over a separate geostationary satellite link on a one-second grid or smaller, thereby easing railcar receiver clock accuracy requirements. This method results in a railcar-location dependent delay from the central station to the railcar receiver. The delay can be accounted for by using iterations in a manner similar to that described above.

Figure 8:
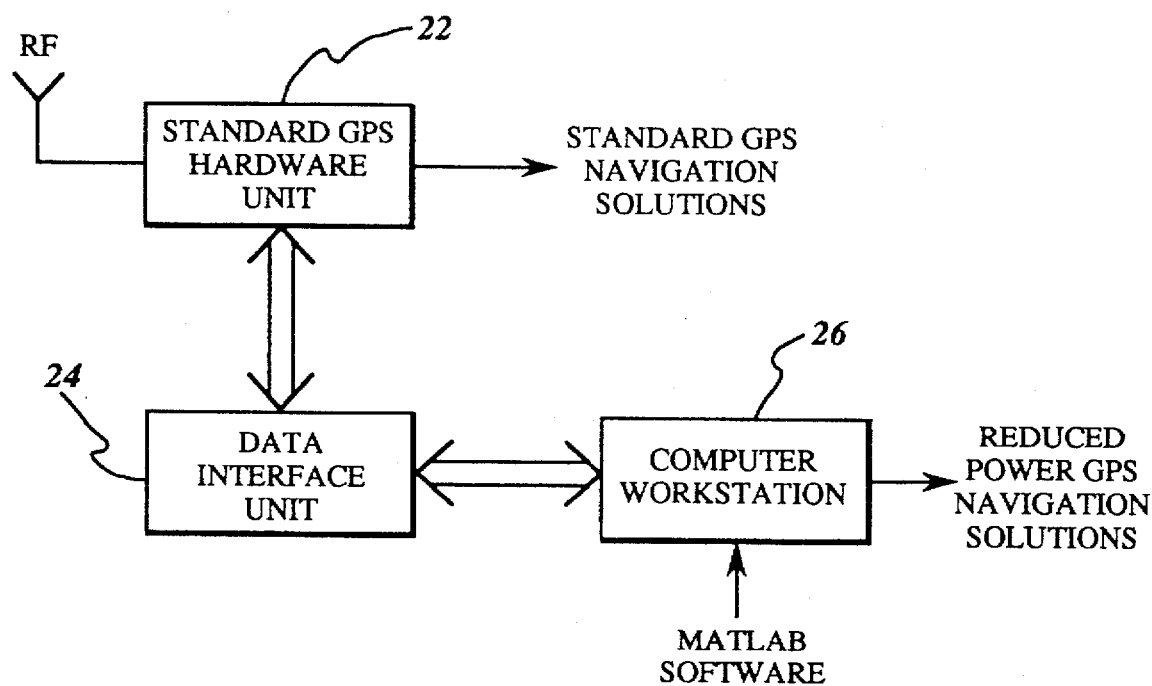
FIG. 8 is a block diagram of a system for evaluating GPS algorithms in accordance with the present invention.

FIG. 8 illustrates a system for evaluating GPS-based localization algorithms for low power tracking applications. The system includes a standard GPS hardware unit 22 for receiving GPS signals and developing standard GPS navigation solutions for reference, and a data interface unit 24 and computer workstation 26 for generating GPS navigation solutions using the reduced-power GPS methods described herein. Standard GPS hardware unit 22 uses a commercially available multi-channel GPS receiver and GPS signal processor to develop standard navigation solutions. Data interface unit 24 collects intermediate GPS signal information from hardware unit 22 (e.g., demodulated but unprocessed GPS data streams), performs some data processing (e.g., calculate relative bit phases of the different GPS signals), and passes the results to computer workstation 26. The data interface unit also collects decoded GPS almanac, ephemeris, and clock correction data from the hardware unit and passes these to the workstation. At the workstation, the various reduced-power GPS tracking algorithms are developed using the commercially available Matlab programming language. Matlab is available from The MathWorks, Inc., Natick, Mass. The tracked unit (railcar) and central-station functions are performed separately in the computer workstation.

While only certain preferred features of the invention have been illustrated and described, many modifications and changes will occur to those skilled in the art. It is, therefore, to be understood that the appended claims are intended to cover all such modifications and changes as fall within the true spirit of the invention.

Attached hereto, as Appendix A, is a source code listing which may be utilized by the central station to calculate the location of the object being tracked, pursuant to method 1 herein.

RD-23,530

- A1 -

Appendix A

Source Code Listing

```
% ROGPS - Solves for user position and time based on ephemeris equations
% and on time-difference measurements from 5 GPS satellites.

% U (3x1) the users position
% time (1x1) seconds
% Ub (3x1) an initial guess at the users position
% dU (3x1) is the adjustment made on the initial guess
% sat (3x5) is the location of each satellite
% H (4x4) matrix differentiating r_diff wrt (U,t)

% sat0 is the (3x5) matrix of 5 sat positions at beginning of
% interpolation interval.
% sat2 is the (3x5) matrix of 5 sat positions at end of interpolation interval.
% V is a (3x5) matrix of velocities for all 5 satellites.

dU = 0;
% step 1: Guess an initial Ubar, and time.
U_true = [1300748.12;-4500694.5;4313770.5]; % Actual user location
Ub  =  [1200748.12;-4400694.5;4319770.5]; % User location guess time_true = 483738.75;
time      = 483638.75;

interval = 300; % Linear interpolation (half) interval for sats.

% select five satellites
% Files that contain ephemeris constants. These happened to be
% visible at the data collection time.
sv1 = sv7_eph ;
sv2 = sv2_eph ;
sv3 = sv9_eph ;
sv4 = sv4_eph ;
sv5 = sv12_eph ;

%%%%%%%%%%%%%%%%%%%%%%%%%%%%%%%%%
%
% Synthesize measurement vector
%
%%%%%%%%%%%%%%%%%%%%%%%%%%%%%%%%%
```

- A2 -

```
% For now, ignore that satellites move during signal propagation
% time. Thus, set ephemeris time to measurement time, time_true.
sv1(1) = time_true;
sv2(1) = time_true;
sv3(1) = time_true;
sv4(1) = time_true;
sv5(1) = time_true;

% Get satellite positions
sat(:,1) = satellite_ephemeris(sv1);
sat(:,2) = satellite_ephemeris(sv2);
sat(:,3) = satellite_ephemeris(sv3);
sat(:,4) = satellite_ephemeris(sv4);
sat(:,5) = satellite_ephemeris(sv5);

% Calculate perfect measured range differences.
for i = 1:4
  r_diff_t(i) = norm(sat(:,1) - U_true) - norm(sat(:,i+1) - U_true) ;
end % Add noise to the measurements
light_speed = 3e8 ;            % Meters/sec
dt_sigma = 1e-7 ;              % One tenth of a chip.
%  r_diff_m = r_diff_t + (light_speed * dt_sigma * randn(1,4)) ;
r_diff_m = r_diff_t + [0 0 0 10] ;
r_diff_m = r_diff_m' ;

dr_var = dt_sigma * 3e8 * dt_sigma * 3e8 ;
r_diff_covar = [    dr_var      0         0         0 ; ...
                    0         dr_var      0         0 ; ...
                    0           0       dr_var      0 ; ...
                    0           0         0       dr_var ]

%%%%%%%%%%%%%%%%%%%%%%%%%%%%%%%%%%%%%
%
% Find satellite average velocities
%
%%%%%%%%%%%%%%%%%%%%%%%%%%%%%%%%%%%%%

% Set time to beginning of interpolation interval
% First element of svi is always time.
sv1(1) = time - interval;
sv2(1) = time - interval;
```

- A3 -

```
sv3(1) = time - interval;
sv4(1) = time - interval;
sv5(1) = time - interval;

% Get satellite positions
satA(:,1) = satellite_ephemeris(sv1);
satA(:,2) = satellite_ephemeris(sv2);
satA(:,3) = satellite_ephemeris(sv3);
satA(:,4) = satellite_ephemeris(sv4);
satA(:,5) = satellite_ephemeris(sv5);

% Set time to end of interpolation interval.
sv1(1) = time + interval;
sv2(1) = time + interval;
sv3(1) = time + interval;
sv4(1) = time + interval;
sv5(1) = time + interval;

% Get satellite positions.
satB(:,1) = satellite_ephemeris(sv1);
satB(:,2) = satellite_ephemeris(sv2);
satB(:,3) = satellite_ephemeris(sv3);
satB(:,4) = satellite_ephemeris(sv4);
satB(:,5) = satellite_ephemeris(sv5);

% calculate x,y,z velocities (in m/s)
V = (satB-satA)/interval;

%%%%%%%%%%%%%%%%%%%%%%%%%%%%%%%%%%%
%
% Form initial H matrix of partials
%
%%%%%%%%%%%%%%%%%%%%%%%%%%%%%%%%%%%

% Partials taken at guessed time and user position.
% Need partials of sat coordinates w.r.t. time. Over the "interval"
% specified above we assume sat velocity is constant. Set partials
% to sat velocities. Compute vector and range from object to each
% satellite.

% Get satellite positions at guessed time.
sv1(1) = time ;
sv2(1) = time ;
```

– A4 –

```
sv3(1) = time ;
sv4(1) = time ;
sv5(1) = time ;
sat(:,1) = satellite_ephemeris(sv1);
sat(:,2) = satellite_ephemeris(sv2);
sat(:,3) = satellite_ephemeris(sv3);
sat(:,4) = satellite_ephemeris(sv4);
sat(:,5) = satellite_ephemeris(sv5);

% Compute estimated sat user vectors and ranges.
for i = 1:5,
   sat_U(:,i) = sat(:,i) - Ub ;
   range(i) = norm(sat_U(:,i)) ;
   DV(:,i) = sat_U(:,i) / range(i) ;
end % Form H matrix of partials at estimated user location and time:
% i'th row of H is H = (pD1i/px, pD1i/py, pD1i/pz, pD1i/pt)
% First three elements is just the difference between the normalized
% direction vectors to the first and to the i'th satellites.
% Last element is difference between 1st and i'th inner products
% of direction vectors with satellite velocity vectors.
for i = 1:4,
   H(i,1:3) = DV(:,i+1)' - DV(:,1)' ;
   H(i,4) = DV(:,1)' * V(:,1) - DV(:,i+1)' * V(:,i+1) ;
end % now compute the first estimate of G
%   G = inv(H);

loop = 0; epsilon = 1; %meter
while ( loop < 20)
   loop = loop + 1;
   % step 3

% Substitute t into ephemeris data and get positions at guessed time.
   % Here we use actual ephemeris equations to find sat positions,
   % but note that the time derivatives of sat position are taken from
   % the linear interpolation.
   sv1(1) = time ;
   sv2(1) = time ;
   sv3(1) = time ;
   sv4(1) = time ;
```

- A5 -

```
sv5(1) = time ;
sat(:,1) = satellite_ephemeris(sv1);
sat(:,2) = satellite_ephemeris(sv2);
sat(:,3) = satellite_ephemeris(sv3);
sat(:,4) = satellite_ephemeris(sv4);
sat(:,5) = satellite_ephemeris(sv5);

sat1(:,loop) = sat(:,1) ;
sat2(:,loop) = sat(:,2) ;
sat3(:,loop) = sat(:,3) ;
sat4(:,loop) = sat(:,4) ;
sat5(:,loop) = sat(:,5) ;

% Compute vector and range from object to each satellite.
% Needed for new H matrix.
for i = 1:5,
   sat_U(:,i) = sat(:,i) - Ub ;
   range(i) = norm(sat_U(:,i)) ;
   DV(:,i) = sat_U(:,i) / range(i) ;
end % compute r_diff using Ubar and t
r_diff(1) = range(1) - range(2) ;
r_diff(2) = range(1) - range(3) ;
r_diff(3) = range(1) - range(4) ;
r_diff(4) = range(1) - range(5) ;

% step 4
% compute range-difference error.
r_diff_error(:,loop) = r_diff_m - r_diff' ;

% step 5
% Form H matrix of partials:
% i'th row of H is H = (pD1i/px, pD1i/py, pD1i/pz, pD1i/pt)
% First three elements is just the difference between the normalized
% direction vectors to the first and to the i'th satellites.
% Last element is difference between 1st and i'th inner products
% of direction vectors with satellite velocity vectors.
for i = 1:4,
   H(i,1:3) = DV(:,i+1)' - DV(:,1)' ;
   H(i,4) = DV(:,1)' * V(:,1) - DV(:,i+1)' * V(:,i+1) ;
```

RD-23,530

– A6 –

```
    end
    H4(:,loop) = H(:,4) ;

% step 6
    % compute G via 1 iteration
%     G = G*(2*eye(4)-H*G);
    G = inv(H) ;
    G4(loop,:) = G(4,:) ;

% step 7
    % compute dU as G * r_diff_error(:,loop)
    dU4 = G * r_diff_error(:,loop) ;
    dU = dU4(1:3);
    dt = dU4(4);

% step 8
    % update position and time estimate Ub = Ub + dU, time = time + dt
    ans_vec(:,loop) = [Ub',time]' ;
    Ub = Ub + dU;
    time = time + dt;

loop;
    end % while

U_covar = G * r_diff_covar * G' ;
    U_sigma(1) = sqrt(U_covar(1,1)) ;
    U_sigma(2) = sqrt(U_covar(2,2)) ;
    U_sigma(3) = sqrt(U_covar(3,3)) ;
    U_sigma(4) = sqrt(U_covar(4,4)) ;

% Plot x,y,z, or t convergence vs loop iteration number.
    % 1 -> x, 2 -> y, 3 -> z, 4 -> time.

%       |
    %       |
    %       v plot(ans_vec(1,:)) ;
end function [vec_satellite_ecf] = satellite_ephemeris(input_vector)

% The following code for calculating satellite positions from ephemeris
% data is taken from ICD-GPS-2000, table 20-IV.
```

RD-23,530

— A7 —

```
t                = input_vector(1,1) ;
m_0              = input_vector(2,1) ;
delta_n          = input_vector(3,1) ;
e                = input_vector(4,1) ;
sqrt_a           = input_vector(5,1) ;
OMEGA_0          = input_vector(6,1) ;
i_0              = input_vector(7,1) ;
omega            = input_vector(8,1) ;
OMEGA_dot        = input_vector(9,1) ;
i_dot            = input_vector(10,1) ;
c_uc             = input_vector(11,1) ;
c_us             = input_vector(12,1) ;
c_rc             = input_vector(13,1) ;
c_rs             = input_vector(14,1) ;
c_ic             = input_vector(15,1) ;
c_is             = input_vector(16,1) ;
t_oe             = input_vector(17,1) ;
iode             = input_vector(18,1) ;

% Earth mass times universal gravity constant (see Ref 1, pp 34).
mu               = 3.986005e14 ;

% Earth rotation rate.
OMEGA_e_dot      = 7.2921151467e-5 ;

% Orbit ellipse semimajor axis length
a                = (sqrt_a)^2 ;

% Mean angular motion (Average angular rate of orbit).
n_0              = (mu/(a^3))^0.5 ;

% Time elapsed since ephemeris reference epoch.
t_k              = t - t_oe ;

if t_k > 302400
          t_k = t_k-604800 ; %correct time for EOW crossovers
elseif t_k < -302400
          t_k = t_k+604800 ; %correct time for EOW crossovers
end % Corrected mean angular motion.
n                = n_0 + delta_n ;

% Mean anomaly (false sat orbit angle in orbit plane, using mean motion).
m_k              = m_0 + n*t_k ;
```

RD-23,530

- A8 -

```
% Eccentric anomaly (true sat orbit angle in orbit plane, from ellipse center).
e_k                = kepler(e,m_k,0.01,10000) ;

% Terms for finding true anomaly.
cosf_k             = (cos(e_k) - e)/(1 - e*cos(e_k)) ;
sinf_k             = ((1 - e^2)^0.5)*sin(e_k)/(1 - e*cos(e_k)) ;

% True anomaly (true sat orbit angle in orbit plane, from earth center).
f_k                = atan2(sinf_k,cosf_k) ;

% Argument of lattitude (sat orbit angle from ascending node point on equator)
phi_k              = f_k + omega ;

sin2phik    = sin(2*phi_k) ;
cos2phik    = cos(2*phi_k) ;

% Argument of lattitude correction.
delta_u_k   = c_us*sin2phik + c_uc*cos2phik ;

% Radius correction.
delta_r_k   = c_rc*cos2phik + c_rs*sin2phik ;

% Correction to inclination.
delta_i_k   = c_ic*cos2phik + c_is*sin2phik ;

% Corrected argument of lattitude.
u_k                = phi_k + delta_u_k ;

% Corrected radius.
r_k                = a*(1 - e*cos(e_k)) + delta_r_k ;

% Corrected inclination.
i_k                = i_0 + delta_i_k + i_dot*t_k ;

% Final x-y position in orbital plane.
x_k_prime   = r_k*cos(u_k) ;
y_k_prime   = r_k*sin(u_k) ;

% Longitude of ascending node.
omega_k = OMEGA_0 + (OMEGA_dot-OMEGA_e_dot)*t_k - OMEGA_e_dot*t_oe ;

% Final sat position in earth-fixed coordinates.
x_k                = x_k_prime*cos(omega_k) - y_k_prime*cos(i_k)*sin(omega_k) ;
y_k                = x_k_prime*sin(omega_k) + y_k_prime*cos(i_k)*cos(omega_k) ;
z_k                = y_k_prime*sin(i_k) ;
```

RD-23,530

- A9 -

```
vec_satellite_ecf = [x_k;y_k;z_k];

end function x = kepler(a,b,epsilon,N)

%KEPLER KEPLER(a,b,epsilon,N) returns the iterated solution to
%       x=a*sin(x)+b. Iterates until the new value is within epsilon
%       of the old value or until the number of iterations
%              reaches N.
old_x = 0;
new_x = b;
iterations=0;
while ((abs(new_x-old_x)>epsilon) & (iterations<N))
            old_x = new_x;
            %disp(new_x);
            new_x = a*sin(old_x)+b;
            iterations = iterations+1;
end
if iterations<N
            x=new_x;
            %disp('Iterations:');
            %disp(iterations);
            %disp(a);
            %disp(b);
            %disp(x);
elseif iterations==N
            disp('Fixed Point Iteration Failed');

end function [param_vec] = sv7_eph()

EphemerisSV07length    = 167;%bytes
SV_PRN                              = 7;

t                                           = 483634.754;

t_ephem                             = 483042;

weeknum                          = 763;
codeL2                              = 1;
L2Pdata                             = 0;
SVacc_raw                 = 7;
```

RD-23,530

– A10 –

| | | |
|---|---|---|
| SV_health | = 0; | |
| IODC | | = 120; |
| T_GD | | = 1.39698e-09; |
| t_oc | | = 485504; |
| a_f2 | | = 0; |
| a_f1 | | = 1.13687e-13; |
| a_f0 | | = 0.000697501; |
| SVacc | | = 32; |
| IODE | | = 120; |
| fit_intvl | = 0; | |
| C_rs | | = −17.2812; |
| delta_n | | = 4.39733e-09; |
| M_0 | | = −1.6207; |
| C_uc | | = −9.27597e-07; |
| ecc | | = 0.00659284; |
| C_us | | = 9.46783e-06; |
| sqrt_A | | = 5153.78; |
| t_oe | | = 485504; |
| C_ic | | = 1.47149e-07; |
| OMEGA_0 | | = 0.793991; |
| C_is | | = −9.31323e-09; |
| i_0 | | = 0.962958; |
| C_rc | | = 197.938; |
| omega | | = −2.69189; |
| OMEGADOT | | = −7.93212e-09; |
| IDOT | | = 7.82175e-11; |
| Axis | | = 2.65614e+07; |
| n | | = 0.00014585; |
| r1me2 | | = 0.999978; |
| OMEGA_n | | = −34.6095; |
| ODOT_n | | = −7.29291e-05; | param_vec =   [t;
              M_0;
              delta_n;
              ecc;
              sqrt_A;
              OMEGA_0;
              i_0;
              omega;
              OMEGADOT;

RD-23,530

- A11 -

```
                            IDOT;
                            C_uc;
                            C_us;
                            C_rc;
                            C_rs;
                            C_ic;
                            C_is;
                            t_oe;
                            IODE];

function [param_vec] = sv2_eph()

EphemerisSV02length  = 167;%bytes
SV_PRN                      = 2;

t                           = 483634.754;

t_ephem                     = 483042;

weeknum                     = 763;
codeL2                      = 1;
L2Pdata                     = 0;
SVacc_raw            = 7;
SV_health            = 0;
IODC                        = 165;
T_GD                        = 9.31323e-10;
t_oc                        = 489600;
a_f2                        = 0;
a_f1                        = -2.16005e-12;
a_f0                        = -0.000109646;
SVacc                       = 32;
IODE                        = 165;
fit_intvl            = 0;
C_rs                        = -30.6562;
delta_n                     = 4.92235e-09;
M_0                         = 0.0785892;
C_uc                        = -1.52551e-06;
ecc                         = 0.0134761;
C_us                        = 4.63426e-06;
sqrt_A                      = 5153.66;
t_oe                        = 489600;
C_ic                        = 1.09896e-07;
OMEGA_0                     = -0.26998;
```

RD-23,530

- A12 -

```
C_is                   = 1.63913e-07;
i_0                    = 0.953377;
C_rc                   = 285.688;
omega                  = -2.63668;
OMEGADOT               = -8.54964e-09;
IDOT                   = -2.16795e-10;
Axis                   = 2.65602e+07;
n                      = 0.00014586;
r1me2                  = 0.999909;
OMEGA_n                = -35.9722;
ODOT_n                 = -7.29297e-05;

param_vec =    [t;
                M_0;
                delta_n;
                ecc;
                sqrt_A;
                OMEGA_0;
                i_0;
                omega;
                OMEGADOT;
                IDOT;
                C_uc;
                C_us;
                C_rc;
                C_rs;
                C_ic;
                C_is;
                t_oe;
                IODE];

function [param_vec] = sv9_eph()

EphemerisSV09length    = 167;%bytes
SV_PRN                 = 9;

t                      = 483634.754;

t_ephem                = 483042;

weeknum                = 763;
codeL2                 = 1;
L2Pdata                = 0;
```

D-23,530

- A13 -

```
SVacc_raw        = 7;
SV_health        = 0;
IODC                             = 592;
T_GD                             = 1.39698e-09;
t_oc                             = 489600;
a_f2                             = 0;
a_f1                             = -1.13687e-12;
a_f0                             = -5.16325e-06;
SVacc                            = 32;
IODE                             = 80;
fit_intvl        = 0;
C_rs                             = 80.1875;
delta_n                          = 4.85127e-09;
M_0                              = -2.65977;
C_uc                             = 4.25801e-06;
ecc                              = 0.00292443;
C_us                             = 5.34952e-06;
sqrt_A                           = 5153.73;
t_oe                             = 489600;
C_ic                             = 5.58794e-09;
OMEGA_0                          = -1.28659;
C_is                             = 2.23517e-08;
i_0                              = 0.950485;
C_rc                             = 270.656;
omega                            = -0.581175;
OMEGADOT                         = -8.33535e-09;
IDOT                             = 2.4501e-10;
Axis                             = 2.6561e+07;
n                                = 0.000145854;
r1me2                            = 0.999996;
OMEGA_n                          = -36.9888;
ODOT_n                           = -7.29295e-05;

param_vec =      [t;
                                 M_0;
                                 delta_n;
                                 ecc;
                                 sqrt_A;
                                 OMEGA_0;
                                 i_0;
                                 omega;
```

RD-23,530

— A14 —

```
            OMEGADOT;
            IDOT;
            C_uc;
            C_us;
            C_rc;
            C_rs;
            C_ic;
            C_is;
            t_oe;
            IODE];

function [param_vec] = sv4_eph()

EphemerisSV04length   = 167;%bytes
SV_PRN                            = 4;

t                                 = 483634.754;

t_ephem                           = 483048;

weeknum                           = 763;
codeL2                            = 1;
L2Pdata                           = 0;
SVacc_raw             = 7;
SV_health             = 0;
IODC                              = 711;
T_GD                              = 1.39698e-09;
t_oc                              = 489600;
a_f2                              = 0;
a_f1                              = 1.59162e-12;
a_f0                              = 4.03658e-05;
SVacc                             = 32;
IODE                              = 199;
fit_intvl             = 0;
C_rs                              = 15.4375;
delta_n                           = 4.67448e-09;
M_0                               = 2.57307;
C_uc                              = 9.76026e-07;
ecc                               = 0.00303051;
C_us                              = 6.10203e-06;
sqrt_A                            = 5153.62;
t_oe                              = 489600;
C_ic                              = 4.09782e-08;
```

RD-23,530

- A15 -

```
OMEGA_0           = 1.86007;
C_is              = 1.11759e-08;
i_0               = 0.963886;
C_rc              = 261.562;
omega             = -1.24408;
OMEGADOT          = -8.10534e-09;
IDOT              = 2.62511e-10;
Axis              = 2.65598e+07;
n                 = 0.000145863;
r1me2             = 0.999995;
OMEGA_n           = -33.8421;
ODOT_n            = -7.29293e-05;

param_vec =   [t;
               M_0;
               delta_n;
               ecc;
               sqrt_A;
               OMEGA_0;
               i_0;
               omega;
               OMEGADOT;
               IDOT;
               C_uc;
               C_us;
               C_rc;
               C_rs;
               C_ic;
               C_is;
               t_oe;
               IODE];

function [param_vec] = sv12_eph()

% This ephemeris data was extracted from test0826.asc
% by Glen Brooksby.

EphemerisSV12length  = 167;%bytes
SV_PRN               = 12;

t                    = 483634.754;

t_ephem              = 482748;
```

RD-23,530

- A16 -

| | | |
|---|---|---|
| weeknum | | = 763; |
| codeL2 | | = 1; |
| L2Pdata | | = 0; |
| SVacc_raw | = 2; | |
| SV_health | = 0; | |
| IODC | | = 323; |
| T_GD | | = 2.79397e−09; |
| t_oc | | = 489600; |
| a_f2 | | = 0; |
| a_f1 | | = −1.21645e−11; |
| a_f0 | | = −2.44565e−05; |
| SVacc | | = 4; |
| IODE | | = 67; |
| fit_intvl | = 0; | |
| C_rs | | = 42.75; |
| delta_n | | = 1.96937e−09; |
| m_0 | | = 3.01393; |
| C_uc | | = 2.28174e−06; |
| ecc | | = 0.0147704; |
| C_us | | = 5.3402e−06; |
| sqrt_a | | = 5153.5; |
| t_oe | | = 489600; |
| C_ic | | = −1.65775e−07; |
| omega_0 | | = −0.925903; |
| C_is | | = 3.91155e−08; |
| i_0 | | = 1.08737; |
| C_rc | | = 338.719; |
| omega | | = −0.167314; |
| OMEGADOT | | = −6.63885e−09; |
| IDOT | | = 1.2572e−10; |
| Axis | | = 2.65585e+07; |
| n | | = 0.000145871; |
| r1me2 | | = 0.999891; |
| OMEGA_n | | = −36.6281; |
| ODOT_n | | = −7.29278e−05; | param_vec = [t;
           m_0;
           delta_n;
           ecc;
           sqrt_a;

RD-23,530

— A17 — omega_0;
i_0;
omega;
OMEGADOT;
IDOT;
C_uc;
C_us;
C_rc;
C_rs;
C_ic;
C_is;
t_oe;
IODE];

What is claimed is:

1. A method for identifying location of an object to be tracked, comprising:

measuring data related to propagation time differences between signals transmitted from a plurality of GPS satellites and received at said object to be tracked, said data comprising code word phase measurements $\mu_i$ for a satellite at a time $t_R$, where $\mu_i = \gamma_i/T_i^C$, and defined as time elapsed to time $t_R$ from the beginning of a code word in the signal from satellite i in which $t_R$ falls, $T_i^C$ being defined as the code period for satellite i at time $t_R$ in the signal received from satellite i, said code word phase measurements being simultaneously derived from the signals transmitted from said plurality of satellites and received at the object to be tracked;

transmitting said data to a central station; and calculating at said central station the location of said object to be tracked based upon the transmitted data and data derived from at least one receiver apart from said object to be tracked receiving said signals from said plurality of satellites.

2. The method of claim 1 wherein the data transmitted to the central station includes satellite identification data so that the step of calculating the location of said object to be tracked is thereupon based further upon the satellite identification data.

3. The method of claim 1 wherein the step of calculating the location of said object comprises calculating a point of intersection of curves defined by said propagation time differences.

4. The method of claim 1 including the step of transmitting time signals to said object to be tracked over a separate channel so as to maintain clock accuracy at said object to be tracked.

5. A method for identifying location of an object to be tracked comprising:

measuring data related to propagation time differences between signals transmitted from a plurality of GPS satellites and received at said object to be tracked, said data comprising bit phase measurements $\mu_i$ for a satellite i at a time $t_R$, where $\mu_i = \beta_i/T_i^B$, $\beta_i$ being the receiver bit-time offset for satellite i and defined as time elapsed to time $t_R$ from the beginning of a code word in the signal from satellite i in which $t_R$ falls, $T_i^B$ being defined as the bit period for satellite i at time $t_R$ in the signal received from satellite i, said bit phase measurements being simultaneously derived from the signals transmitted from said plurality of satellites and received at the object to be tracked;

transmitting said data to a central station; and calculating at said central station the location of said object to be tracked based upon the transmitted data and data derived from at least one receiver apart from said object to be tracked receiving said signals from said plurality of satellites.

6. The method of claim 5 and further including:

recording, at said object, the time at which the data are simultaneously derived; and transmitting the recorded time to said central station.

7. The method of claim 5 and further including:

measuring, at said object to be tracked, delay between the time at which the data are recorded and the time when the data are transmitted to the central station; and transmitting the measured delay to said central station.

8. The method of claim 5 wherein the data transmitted to the central station includes satellite identification data and the step of calculating the location of said object to be tracked is additionally based upon the satellite identification data.

9. The method of claim 5 wherein the step of calculating the location of said object comprises calculating a point of intersection of curves defined by said propagation time differences.

10. The method of claim 5 wherein the signals from said GPS satellites are received at said object to be tracked, and including the step of transmitting time signals to said object to be tracked over a separate channel so as to maintain clock accuracy at said object to be tracked.

11. A method for identifying location of an object to be tracked comprising:

measuring data related to propagation time differences between signals transmitted from a plurality of satellites and received at said object to be tracked, said data comprising receiver code-time offsets for a satellite i and defined as time elapsed to a time $t_R$ from the beginning of a code word in the signal from satellite i in which $t_R$ falls, and code periods in the signal received from satellite i in which time $t_R$ falls, said plurality of satellites comprising GPS satellites, and including the additional step of simultaneously deriving said receiver code-time offsets and code periods from signals received from the plurality of satellites at said object to be tracked;

transmitting said data to a central station; and calculating at said central station the location of said object to be tracked based upon the transmitted data and data derived from at least one receiver apart from said object to be tracked receiving said signals from said plurality of satellites.

12. A method for identifying location of an object to be tracked, comprising:

measuring data related to propagation time differences between signals transmitted from at least four GPS satellites and received at said object to be tracked, said data related to propagation time differences comprising bit phase measurements simultaneously derived from said signals;

transmitting said data, including satellite identification data, to a central station;

measuring, at said object to be tracked, delay between the time at which the data are recorded and the time when the data are transmitted to the central station;

transmitting the measured delay to said central station; and calculating at said central station the location of said object to be tracked based upon the transmitted data, the satellite identification data, and data derived from at least one receiver apart from said object to be tracked receiving said signals from said plurality of satellites, the calculating step comprising:

assuming a feasible value for a communication time delay required for a signal transmitted from said object to be tracked to reach the central station;

calculating the location of said object to be tracked based upon the satellite identification data and the assumed value of said communication time delay;

calculating a new value for said communication time delay based upon the calculated location of said object to be tracked; and calculating a corrected location of said object to be tracked based upon the calculated new value for said communication time delay.

13. The method of claim 12 including the additional step of:

iteratively repeating the calculating steps until little change in location of said object to be tracked is observable.

14. A system for identifying location of an object to be tracked, comprising:

means for measuring data related to propagation time differences between signals transmitted from a plurality of GPS satellites and received at said object to be tracked, each of said signals identifying an associated satellite, said object to be tracked including:
  receiver means for receiving signals from at least four GPS satellites; and
  first processor means for processing data from the receiver means at predetermined time intervals in synchronism with received signal events, said data being related to propagation time differences for said signals;

receiver means apart from said object for receiving said signals transmitted from said plurality of satellites;

a central station for calculating the location of said object based upon the measured data, data derived from said receiver means apart from said object, and the satellite identification data; and transmission means for transmitting the processed data to said central station;

said system further including:
  second processor means at said central station for determining the location of said object based on the data received from said transmission means and data derived from said receiver means apart from said object.

15. The system of claim 14 wherein said signal events comprise a telemetry-word preamble signal event in a GPS signal.

16. The system of claim 15 wherein said first processor means further comprises means for decoding a satellite time stamp from a predetermined one of the received GPS signals, based upon the telemetry-word preamble signal event.

17. A method for identifying location of an object to be tracked comprising:

means for measuring data related to propagation time differences between signals transmitted from a plurality of GPS satellites and received at said object to be tracked, each of said signals identifying an associated satellite, said object to be tracked including:
  receiver means for receiving signals from at least four GPS satellites; and
  first processor means for calculating a receiver bit phase for each of said satellites, said bit phase for any satellite i at a time $t_R$ being defined as $\beta_i/T_i^B$, $\beta_i$ being the receiver bit-time offset for satellite i and defined as time elapsed to time $t_R$ from the beginning of a code word in the signal from satellite i in which $t_R$ falls, and $T_i^B$ being defined as the bit period for satellite i at time $t_g$ in the signal received from satellite i;

receiver means apart from said object for receiving said signals from said plurality of satellites;

a central station; and transmission means for transmitting the calculated bit phases to said central station;

said system further including:
  second processor means at said central station for determining signal propagation times between said plurality of satellites and said object and for determining location of said object based upon the bit phases transmitted by said transmission means and data derived from said receiver means apart from said object.

18. A system for identifying location of an object to be tracked, comprising:

means for measuring data related to propagation time differences between signals transmitted from a plurality of GPS satellites and received at said object to be tracked, each of said signals identifying an associated satellite, said object to be tracked including:
  receiver means for receiving signals from at least four GPS satellites, and
  first processor means for calculating a bit-time offset for each of said satellites and for determining a bit period for each signal received from said satellites, said bit-time offset for a satellite i being defined as time elapsed to a time $t_R$ from the beginning of a code word in the signal from satellite i in which $t_R$ falls, said bit period for satellite i being determined at time $t_R$ in the signal from satellite i;

receiver means apart from said object for receiving said signals from said plurality of satellites;

a central station; and transmission means for transmitting time stamps, the calculated bit-time offsets and bit periods, and satellite identification data, to said central station;

said system further including:
  second processor means at said central station for determining signal propagation times between said plurality of satellites and said object and for determining location of said object based upon the bit-time offsets and periods, time stamps, satellite identification data transmitted by said transmission means, and data derived from said receiver means apart from said object.

* * * * *